(12) United States Patent
Nagatomo et al.

(10) Patent No.: US 10,113,919 B2
(45) Date of Patent: Oct. 30, 2018

(54) TEMPERATURE SENSOR AND METHOD FOR PRODUCING SAME

(71) Applicant: MITSUBISHI MATERIALS CORPORATION, Tokyo (JP)

(72) Inventors: Noriaki Nagatomo, Naka (JP); Hitoshi Inaba, Naka (JP); Hiroshi Tanaka, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 786 days.

(21) Appl. No.: 14/388,693

(22) PCT Filed: Mar. 22, 2013

(86) PCT No.: PCT/JP2013/059786
§ 371 (c)(1),
(2) Date: Sep. 26, 2014

(87) PCT Pub. No.: WO2013/147282
PCT Pub. Date: Oct. 3, 2013

(65) Prior Publication Data
US 2015/0071326 A1 Mar. 12, 2015

(30) Foreign Application Priority Data

Mar. 29, 2012 (JP) ................. 2012-076410

(51) Int. Cl.
*G01K 7/00* (2006.01)
*G01K 7/22* (2006.01)
(Continued)

(52) U.S. Cl.
CPC ............. *G01K 7/226* (2013.01); *H01C 1/142* (2013.01); *H01C 7/008* (2013.01); *H01C 17/12* (2013.01);
(Continued)

(58) Field of Classification Search
CPC .......... G01K 7/226; G01K 7/22; H01C 7/008; H01C 7/04
See application file for complete search history.

(56) References Cited

U.S. PATENT DOCUMENTS

2007/0148416 A1* 6/2007 Wolkin ................ G01K 17/006
428/195.1
2011/0081539 A1* 4/2011 Ni ........................ C23C 14/0641
428/328
2011/0316112 A1* 12/2011 Noda ........................ G01J 5/02
257/467

FOREIGN PATENT DOCUMENTS

CN 102192792 A 9/2011
JP 2004319737 A 11/2004
(Continued)

OTHER PUBLICATIONS

Office Action dated Jul. 13, 2016, issued for the corresponding Taiwanese Patent Application No. 102111179 and English translation thereof.
(Continued)

*Primary Examiner* — Lisa Caputo
*Assistant Examiner* — Janice M Soto
(74) *Attorney, Agent, or Firm* — Locke Lord LLP (57) ABSTRACT

Provided are a temperature sensor that is hard to increase resistance in the electrode structure with respect to a Ti—Al—N thermistor material layer even under a high-temperature environment, and has a high reliability with a high heat resistance as well as a method for producing the same. The temperature sensor includes an insulation substrate; a thin film thermistor portion formed on the insulation substrate; and a pair of pattern electrodes formed on the insulation substrate with a pair of opposed electrode portions being arranged so as to be opposed to each other on the thin film thermistor portion, wherein the thin film thermistor portion
(Continued)

is made of a Ti—Al—N thermistor material, and the pair of pattern electrodes has a Ti—N bonding layer formed on the thin film thermistor portion and an electrode layer made of a noble metal formed on the bonding layer.

4 Claims, 8 Drawing Sheets

(51) Int. Cl.
  *H01C 17/12* (2006.01)
  *H01C 1/142* (2006.01)
  *H01C 7/00* (2006.01)
  *H01C 17/28* (2006.01)
  *H01C 1/148* (2006.01)
  *C23F 1/38* (2006.01)
(52) U.S. Cl.
  CPC .............. *H01C 17/288* (2013.01); *C23F 1/38* (2013.01); *H01C 1/148* (2013.01)

(56) References Cited

FOREIGN PATENT DOCUMENTS

| | | |
|---|---|---|
| JP | 2008294288 A | 2/2008 |
| JP | 2008-244314 A | 10/2008 |
| JP | 2008244344 A | 10/2008 |
| JP | 2010-281578 A | 12/2010 |
| JP | 2012182258 A | 9/2012 |
| TW | 536525 B | 6/2003 |

OTHER PUBLICATIONS

International Search Report dated Jul. 9, 2013 for PCT/JP2013/059786.

\* cited by examiner

TEMPERATURE SENSOR AND METHOD FOR PRODUCING SAME

CROSS-REFERENCE TO RELATED APPLICATIONS

This application is the national phase under 35 U.S.C. § 371 of PCT International Application No. PCT/JP2013/059786, filed Mar. 22, 2013, which claims the benefit of Japanese Patent Application No. 2012-076410 filed Mar. 29, 2012, the entire contents of the aforementioned application are hereby incorporated herein by reference.

BACKGROUND OF THE INVENTION

[Field of the Invention]

The present invention relates to a temperature sensor suitable for a film type thermistor temperature sensor and a method for producing the same.

[Description of the Related Art]

There is a demand for a thermistor material used for a temperature sensor or the like having a high B constant in order to obtain a high precision and high sensitivity temperature sensor. Conventionally, transition metal oxides such as Mn, Co, Fe, and the like are typically used as such thermistor materials (see Patent Documents 1 and 2). These thermistor materials also need firing at a temperature of 600° C. or higher in order to obtain a stable thermistor characteristic/property.

In addition to thermistor materials consisting of metal oxides as described above, Patent Document 3 discloses a thermistor material consisting of a nitride represented by the general formula: $M_xA_yN_z$ (where "M" represents at least one of Ta, Nb, Cr, Ti, and Zr, "A" represents at least one of Al, Si, and B, $0.1 \leq x \leq 0.8$, $0 < y \leq 0.6$, $0.1 \leq z \leq 0.8$, and $x+y+z=1$). In Patent Document 3, only a Ta—Al—N-based material consisting of a nitride represented by the general formula: $M_xA_yN_z$ (where $0.5 \leq x \leq 0.8$, $0.1 \leq y \leq 0.5$, $0.2 \leq z \leq 0.7$, and $x+y+z=1$) is described in an Example. The Ta—Al—N-based material is produced by sputtering in a nitrogen gas-containing atmosphere using a material containing the element(s) listed above as a target. The resultant thin film is subject to a heat treatment at a temperature from 350 to 600° C. as required.

PRIOR ART DOCUMENTS

Patent Documents

[Patent Document 1] Japanese Patent Laid-Open No. 2003-226573
[Patent Document 2] Japanese Patent Laid-Open No. 2006-324520
[Patent Document 3] Japanese Patent Laid-Open No. 2004-319737

SUMMARY OF THE INVENTION

Problems to be Solved by the Invention

The following problems still remain in the conventional techniques described above.

In recent years, the development of a film type thermistor sensor made of a thermistor material formed on a resin film has been considered, and thus, it has been desired to develop a thermistor material that can be directly deposited on a film. Specifically, it is expected that a flexible thermistor sensor will be obtained by using a film. Furthermore, it is desired to develop a very thin thermistor sensor having a thickness of about 0.1 mm. However, a substrate material using a ceramic material such as alumina that has often been conventionally used has a problem that if the substrate material is thinned to a thickness of 0.1 mm for example, the substrate material is very fragile and breaks easily. Thus, it is expected that a very thin thermistor sensor will be obtained by using a film.

Conventionally, when a temperature sensor made of a nitride-based thermistor material consisting of Ti—Al—N is formed by stacking a thermistor material layer consisting of Ti—Al—N and an electrode layer on a film, the electrode layer made of Au or the like is deposited on the thermistor material layer, and then the deposited film is patterned so as to have a comb shape or the like. However, since a noble metal such as Au as an electrode material has a low bondability to a Ti—Al—N thermistor material or film, a Cr or Ni—Cr bonding layer is first deposited on a film, then a noble metal such as Au is deposited thereon, and the deposited film is patterned so as to have a comb shape or the like. Then, a Ti—Al—N thermistor material layer is patterned thereon. However, this electrode structure disadvantageously has a low reliability that the bonding layer is oxidized to increase resistance in a high-temperature test or the like.

In addition, a film made of a resin material typically has a low heat resistance temperature of 150° C. or lower, and even polyimide, which is known as a material having a relatively high heat resistance temperature, only has a heat resistance to a temperature of about 200° C. Hence, when a heat treatment is performed in a process of forming a thermistor material, it has been conventionally difficult to use such a thermistor material. Therefore, since the above-described conventional oxide thermistor material needs to be fired at a temperature of 600° C. or higher in order to realize a desired thermistor characteristic, a film type thermistor sensor in which the thermistor material is directly deposited on a film cannot be realized using such a thermistor material. Thus, it has been desired to develop a thermistor material that can be directly deposited on a film without firing. However, even the thermistor material disclosed in Patent Document 3 still needs a heat treatment on the resultant thin film at a temperature from 350 to 600° C. as required in order to obtain a desired thermistor characteristic. Regarding this thermistor material, a B constant of about 500 to 3000 K was obtained in an Example of the Ta—Al—N-based material, but the heat resistance of this material is not described and therefore, the thermal reliability of a nitride-based material is unknown.

The present invention has been made in view of the aforementioned circumstances, and an object of the present invention is to provide a temperature sensor that is hard to increase resistance in the electrode structure with respect to a Ti—Al—N thermistor material layer even under a high-temperature environment, further can directly deposited on a film or the like without firing, and has a reliability with a high heat resistance as well as a method for producing the same.

Means for Solving the Problems

The present invention adopts the following configuration in order to overcome the aforementioned problems. Specifically, a temperature sensor according to a first aspect of the present invention is characterized by comprising an insulation substrate; a thin film thermistor portion formed on the insulation substrate; and a pair of pattern electrodes formed on the insulation substrate with a pair of opposed electrode portions being arranged so as to be opposed to each other on the thin film thermistor portion, wherein the thin film thermistor portion is made of a Ti—Al—N thermistor material, and the pair of pattern electrodes has a Ti—N bonding layer formed on the thin film thermistor portion and an electrode layer made of a noble metal formed on the bonding layer.

Since, in this temperature sensor, the pair of pattern electrodes has the Ti—N bonding layer formed on the thin film thermistor portion and the electrode layer made of a noble metal formed on the bonding layer, the bondability between the Ti-Al-N thin film thermistor portion and the Ti—N bonding layer, both of which are consisting of nitrides, becomes high. In addition, the bondability between the Ti—N bonding layer and the electrode layer made of a noble metal is also high. Furthermore, since the bonding layer consisting of a Ti—N nitride is hard to be oxidized compared with metals such as Cr and Ni—Cr and is thus hard to increase resistance, a high reliability can be obtained. Therefore, since the bondability between the thin film thermistor portion, the bonding layer, and the electrode layer becomes high, a high reliability to bending or the like and a stable thermistor characteristic under a high-temperature environment can be obtained as in a conventional Cr bonding layer.

A temperature sensor according to a second aspect of the present invention is characterized in that the insulation substrate in the temperature sensor according to the first aspect of the present invention is an insulation film.

Specifically, in this temperature sensor, since the insulation substrate is an insulation film, a thin temperature sensor that is deposited as a film as a whole can be obtained, which is flexible and has a smooth surface. Thus, the installation freedom thereof can be significantly improved. In addition, the separation of the thin film thermistor portion is hard to occur when the insulation film is bent, and its placement on a curved surface or the like is also possible.

A temperature sensor according to a third aspect of the present invention is characterized in that the thin film thermistor portion in the temperature sensor according to the first or second aspect of the present invention consists of a metal nitride represented by the general formula: $Ti_xAl_yN_z$ (where $0.70 \leq y/(x+y) \leq 0.95$, $0.4 \leq z \leq 0.5$, and $x+y+z=1$), wherein the crystal structure thereof is a hexagonal wurtzite-type single phase.

The present inventors' serious endeavor carried out by focusing on an Al—N-based material among nitride materials found that an Al—N-based material having a good B constant and an excellent heat resistance may be obtained without firing by substituting the Al site with a specific metal element for improving electric conductivity and by ordering it into a specific crystal structure even though Al—N is an insulator and difficult to provide with an optimum thermistor characteristic (B constant: about 1000 to 6000 K).

Therefore, the present invention has been made on the basis of the above finding that when the thin film thermistor portion consists of a metal nitride represented by the general formula: $Ti_xAl_yN_z$ (where $0.70 \leq y/(x+y) \leq 0.95$, $0.4 \leq z \leq 0.5$, and $x+y+z=1$), wherein the crystal structure thereof is a hexagonal wurtzite-type single phase, a good B constant and a high heat resistance can be obtained without firing.

Note that when the value of "y/(x+y)" (i.e., Al/(Ti+Al)) is less than 0.70, a wurtzite-type single phase cannot be obtained, but two coexisting phases of a wurtzite-type phase and a NaCl-type phase or a single phase of only a NaCl-type phase may be obtained. Consequently, a sufficiently high resistance and a high B constant cannot be obtained.

When the value of "y/(x+y)" (i.e., Al/(Ti+Al)) exceeds 0.95, the metal nitride material exhibits very high resistivity and extremely high electrical insulation. Therefore, such a metal nitride material is not applicable as a thermistor material.

When the value of "z" (i.e., N/(Ti+Al+N)) is less than 0.4, the amount of nitrogen contained in the metal is too small to obtain a wurtzite-type single phase. Consequently, a sufficiently high resistance and a high B constant cannot be obtained.

Furthermore, when the value of "z" (i.e., N/(Ti+Al+N)) exceeds 0.5, a wurtzite-type single phase cannot be obtained. This is because the correct stoichiometric ratio of N/(Ti+Al+N) in a wurtzite-type single phase without defects at the nitrogen site is 0.5.

A method for producing a temperature sensor according to a fourth aspect of the present invention is characterized by a method for producing the temperature sensor according any one of the first to third aspects of the present invention, the method comprising the steps of: forming a thin film thermistor portion for patterning the thin film thermistor portion on the insulation substrate; and forming an electrode for patterning the pair of pattern electrodes on the insulation substrate with the pair of opposed electrode portions being arranged so as to be opposed to each other on the thin film thermistor portion, wherein the step of forming a thin film thermistor portion includes a step of pattering the Ti—Al—N thin film thermistor portion on the insulation substrate, and the step of forming an electrode includes the steps of: depositing the bonding layer on the thin film thermistor portion and the insulation substrate; depositing the electrode layer on the bonding layer; etching the deposited electrode layer so as to be patterned into a predetermined shape; and etching the deposited bonding layer using Ti etchant having a higher etching speed with respect to Ti—N than Ti—Al—N so as to be patterned into a predetermined shape.

Specifically, in this method for producing the temperature sensor, since the deposited bonding layer is etched using Ti etchant having a higher etching speed with respect to Ti—N than Ti-Al-N so as to be patterned into a predetermined shape, only the Ti—N bonding layer can be easily patterned using the difference of etching speed.

Effects of the Invention

According to the present invention, the following effects may be provided.

Specifically, in the temperature sensor and the method for producing the same according to the present invention, since the pair of pattern electrodes has the Ti—N bonding layer formed on the thin film thermistor portion and the electrode layer made of a noble metal formed on the bonding layer, the bondability between the Ti—Al—N thin film thermistor portion and the Ti—N bonding layer, both of which are consisting of nitrides, becomes high. In addition, since the Ti—N bonding layer is hard to be oxidized, a high reliability can be obtained.

Furthermore, when the thin film thermistor portion is consisting of a metal nitride represented by the general formula: $Ti_xAl_yN_z$ (where $0.70 \leq y/(x+y) \leq 0.95$, $0.4 \leq z \leq 0.5$, and $x+y+z=1$), wherein the crystal structure thereof is a hexagonal wurtzite-type single phase, a good B constant and a high heat resistance can be obtained without firing.

Therefore, the temperature sensor according to the present invention is flexible and has a smooth surface because the insulation substrate is an insulation film. Thus it can be inserted and installed into a narrow opening of a contactless power feeding apparatus, a battery, or the like, and can be placed on a curved surface.

DESCRIPTION OF THE EMBODIMENTS

Hereinafter, a temperature sensor and a method for producing the same according to one embodiment of the present invention will be described with reference to FIGS. 1 to 4. In the drawings used in the following description, the scale of each component is changed as appropriate so that each component is recognizable or is readily recognized.

Figure 1:
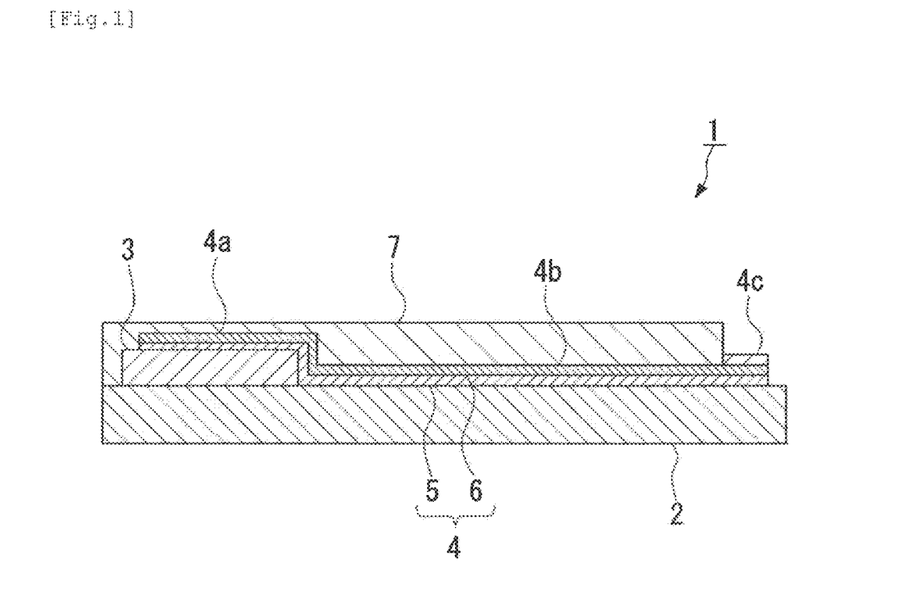
FIG. 1 is a cross-sectional view illustrating a temperature sensor along a pattern electrode, according to one embodiment of a temperature sensor and a method for producing the same of the present invention.
Figure 2:
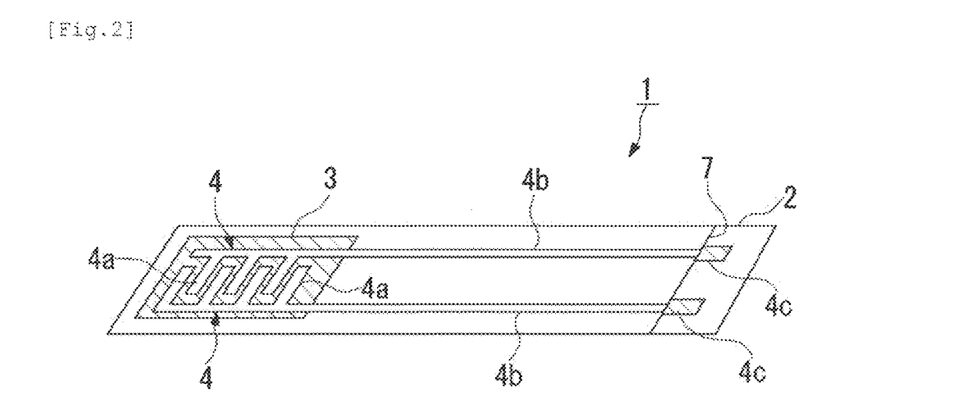
FIG. 2 is a perspective view illustrating a temperature sensor according to the present embodiment.

A temperature sensor 1 of the present embodiment is a film type thermistor sensor including an insulation substrate 2; a thin film thermistor portion 3 formed on the insulation substrate 2; and a pair of pattern electrodes 4 formed on the insulation substrate 2 with a pair of opposed electrode portions 4a being arranged so as to be opposed to each other on the thin film thermistor portion 3, as shown in FIGS. 1 and 2.

The insulation substrate 2 is an insulation film made of a polyimide resin sheet formed in a band shape, for example. The insulation substrate may be made of another material such as polyethylene terephthalate (PET), polyethylene naphthalate (PEN), or the like.

The thin film thermistor portion 3 is made of a Ti—Al—N thermistor material. In particular, the thin film thermistor portion 3 consists of a metal nitride represented by the general formula: $Ti_xAl_yN_z$ (where $0.70 \leq y/(x+y) \leq 0.95$, $0.4 \leq z \leq 0.5$, and $x+y+z=1$), wherein the crystal structure thereof is a hexagonal wurtzite-type single phase.

The pair of pattern electrodes 4 has a Ti—N bonding layer 5 formed on the thin film thermistor portion 3, and an electrode layer 6 made of a noble metal formed on the bonding layer 5.

The pair of pattern electrodes 4 has the pair of opposed electrode portions 4a that is a pair of comb shaped electrode portions having a comb shaped pattern that is arranged so as to be opposed to each other, and a pair of linear extending portions 4b extending with the tip ends thereof being connected to these comb shaped electrode portions 4a and the base ends thereof being arranged at the end of the insulation substrate 2.

A plating portion 4c such as Au plating is formed as a lead wire drawing portion on the base end of each of the pair of linear extending portions 4b. One end of the lead wire is joined with the plating portion 4c via a solder material or the like. Furthermore, except for the end of the insulation substrate 2 including the plating portions 4c, a polyimide coverlay film 7 is pressure bonded to the insulation substrate 2. Instead of the polyimide coverlay film 7, a polyimide or epoxy-based resin material may be formed on the insulation substrate 2 by printing.

Figure 3:
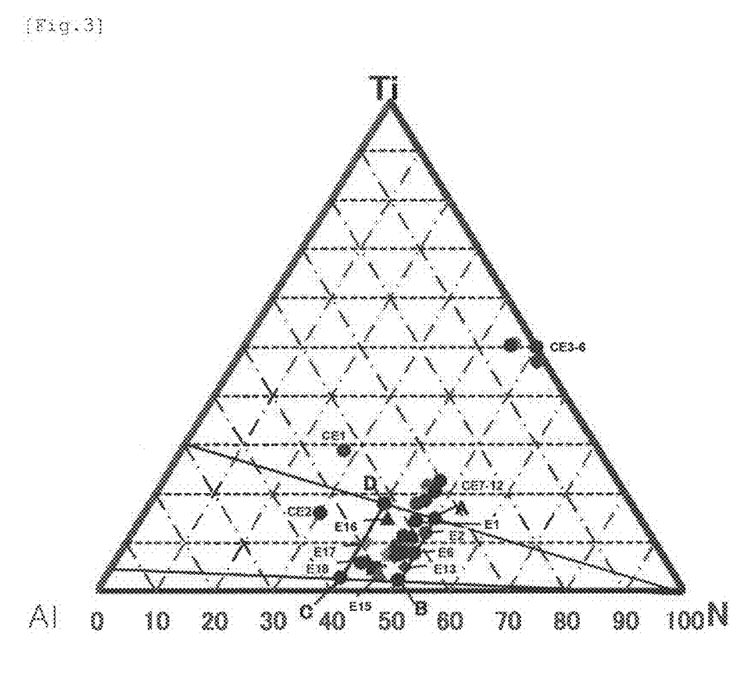
FIG. 3 is a Ti—Al—N-based ternary phase diagram illustrating the composition range of a metal nitride material for a thermistor according to the present embodiment.

As described above, the thin film thermistor portion 3 is made of a metal nitride material consisting of a metal nitride represented by the general formula: $Ti_xAl_yN_z$ (where $0.70 \leq y/(x+y) \leq 0.95$, $0.4 \leq z \leq 0.5$, and $x+y+z=1$), wherein the crystal structure thereof is a hexagonal crystal system and a wurtzite-type (space group: $P6_3mc$ (No. 186)) single phase. Specifically, this metal nitride material consists of a metal nitride having a composition within the region enclosed by the points A, B, C, and D in the Ti—Al—N-based ternary phase diagram as shown in FIG. 3, wherein the crystal phase thereof is wurtzite-type.

Note that the composition ratios of (x, y, z) (at %) at the points A, B, C, and D are A (15, 35, 50), B (2.5, 47.5, 50), C (3, 57, 40), and D (18, 42, 40), respectively.

Also, the thin film thermistor portion 3 is deposited as a film, and is a columnar crystal extending in a vertical direction with respect to the surface of the film. Furthermore, it is preferable that the material of the thin film thermistor portion 3 is more strongly oriented along the c-axis than the a-axis in a vertical direction with respect to the surface of the film.

Note that the decision about whether the material of the thin film thermistor portion 3 has a strong a-axis orientation (100) or a strong c-axis orientation (002) in a vertical direction with respect to the surface of the film (film thickness direction) is determined by examining the orientation of the crystal axis using X-ray diffraction (XRD). When the peak intensity ratio of "the peak intensity of (100)"/"the peak intensity of (002)", where (100) is the Miller index indicating a-axis orientation and (002) is the Miller index indicating c-axis orientation, is less than 1, the material of the thin film thermistor portion 3 is determined to have a strong c-axis orientation.

Hereinafter, a method for producing the temperature sensor 1 will be described with reference to FIG. 4.

The method for producing the temperature sensor 1 of the present embodiment includes a step of forming a film thermistor portion for patterning the thin film thermistor portion 3 on the insulation substrate 2; and a step of forming an electrode for patterning the pair of electrodes 4 on the insulation substrate 2 with the pair of opposed electrode portions 4a being arranged so as to be opposed to each other on the thin film thermistor portion 3.

In the step of forming a film thermistor portion described above, the Ti—Al—N thin film thermistor portion 3 is patterned on the insulation substrate 2 by a sputtering method using a metal mask.

In addition, the step of forming an electrode described above includes the steps: depositing the bonding layer 5 on the thin film thermistor portion 3 and the insulation substrate 2; depositing the electrode layer 6 on the bonding layer 5; etching the deposited electrode layer 6 so as to be patterned into a predetermined shape; and etching the deposited bonding layer 5 using Ti etchant having a higher etching speed with respect to Ti—N than Ti—Al—N so as to be patterned into a predetermined shape.

Figure 4:
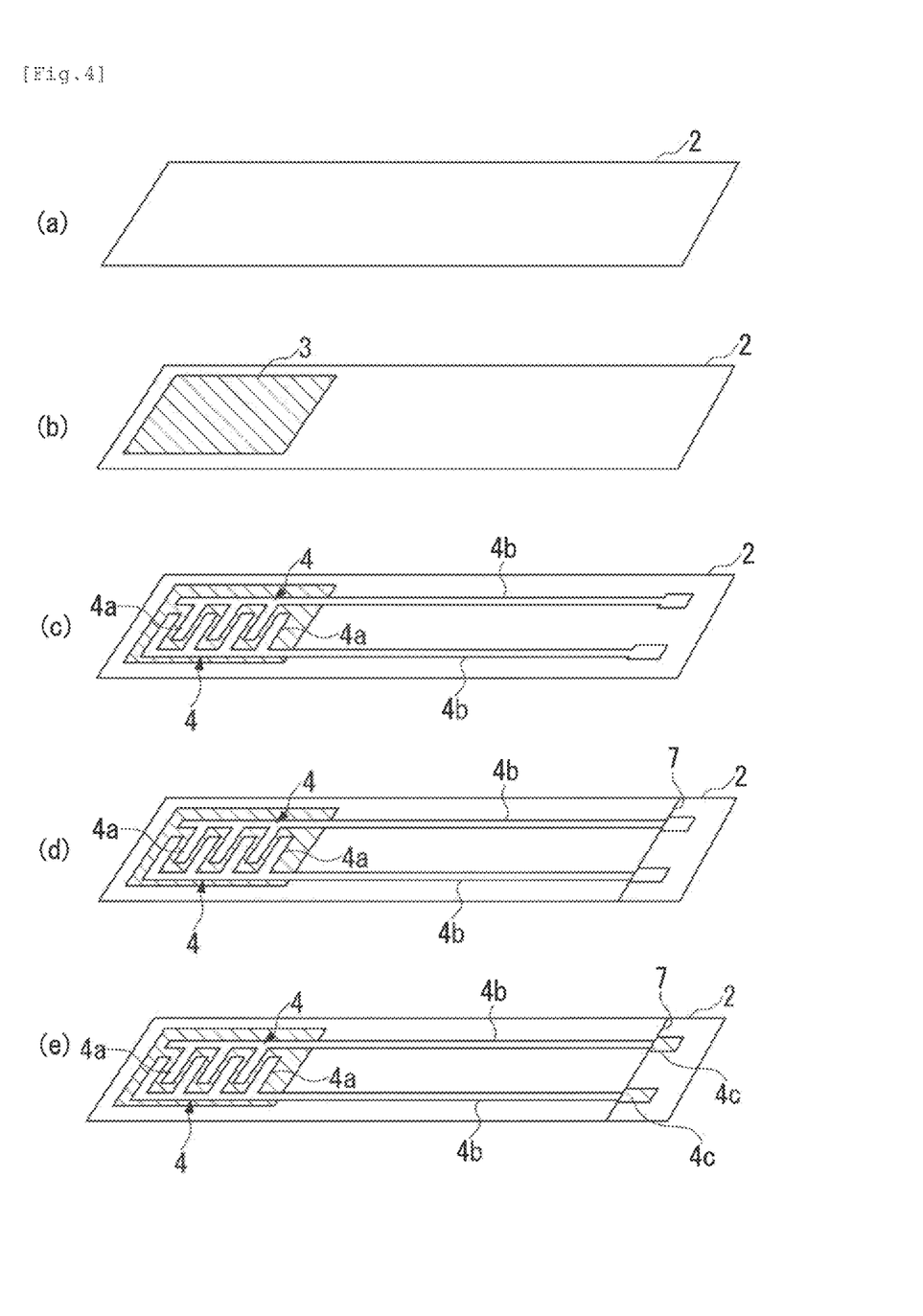
FIG. 4 is a perspective view illustrating a method for producing a temperature sensor in the order of the steps according to the present embodiment.

A more specific example of the method for producing the temperature sensor 1 includes a step of patterning the thin film thermistor portion 3 consisting of $Ti_xAl_yN_z$ (where x=9, y=43, and z=48) so as to have a film thickness of 200 nm and a predetermined shape on the insulation substrate 2 made of a polyimide film having a thickness of 50 μm shown in FIG. 4(a) by a reactive sputtering method using a metal mask in a nitrogen-containing atmosphere using a Ti—Al alloy sputtering target. The sputtering conditions at this time are as follows: an ultimate vacuum: $5 \times 10^{-6}$ Pa, a sputtering gas pressure: 0.4 Pa, a target input power (output): 200 W, and a nitrogen gas partial pressure under a mixed gas (Ar gas+nitrogen gas) atmosphere: 20%.

In this way, the thin film thermistor portion 3 is formed as desired as shown in FIG. 4(b).

Next, the bonding layer 5 made of a Ti—N film having a film thickness of 20 nm is formed on the thin film thermistor portion 3 and the insulation substrate 2 by a reactive sputtering method. The sputtering conditions of the bonding layer 5 are as follows: an ultimate vacuum: $1 \times 10^{-6}$ Pa, a sputtering gas pressure: 0.67 Pa, a target input power (output): 300 W, and a nitrogen gas partial pressure under a mixed gas (Ar gas+nitrogen gas) atmosphere: 12.5%. Furthermore, the electrode layer 6 made of an Au film having a film thickness of 200 nm is formed on this bonding layer 5 by a sputtering method.

Next, a resist solution was coated on the deposited electrode layer 6 using a bar coater, and then pre-baking was performed for 1.5 minutes at a temperature of 110° C. After being exposed by an exposure device, any unnecessary portion was removed by a developing solution, and then patterning was performed by post-baking for 5 minutes at a temperature of 150° C. Then, any unnecessary electrode portion was subject to wet etching using commercially available Au etchant and Ti etchant in that order, and then the resist was stripped so as to form the pair of pattern electrodes 4 as desired, as shown in FIG. 4(c).

Note that since the Ti etchant used has a higher etching speed with respect to Ti—N of the bonding layer 5 than Ti—Al—N of the thin film thermistor portion 3, only the bonding layer 5 can be selectively etched using the difference of etching speed. Examples of such Ti etchants include Ti etchant containing a mixture of an alkaline aqueous solution such as aqueous NaOH and a hydrogen peroxide solution at a ratio by weight of 1:1.

Next, as shown in FIG. 4(d), the polyimide coverlay film 7 with an adhesive having a thickness of 50 μm, for example, is placed on the insulation substrate 2, and then bonded to each other under pressurization of 2 MPa at a temperature of 150° C. for 10 minutes using a press machine. Furthermore, as shown in FIG. 4(e), an Au thin film having a thickness of 2 μm, for example, is formed at the base ends of the linear extending portions 4b using an Au plating solution so as to form the plating portions 4c.

When a plurality of temperature sensors 1 is simultaneously produced, a plurality of thin film thermistor portions 3 and a plurality of pattern electrodes 4 are formed on a large-format sheet of the insulation substrate 2 as described above, and then, the resulting large-format sheet is cut into a plurality of segments so as to obtain a plurality of temperature sensors 1.

In this way, the temperature sensor 1 that is a thin film type thermistor sensor having a size of 25×3.6 mm and a thickness of 0.1 mm is obtained, for example.

As described above, in the temperature sensor 1 of the present embodiment, since the pair of pattern electrodes 4 has the Ti—N bonding layer 5 formed on the thin film thermistor portion 3 and the electrode layer 6 made of a noble metal formed on the bonding layer 5, the bondability between the Ti—Al—N thin film thermistor portion 3 and the Ti—N bonding layer 5, both of which are made of nitrides, becomes high. In addition, the bondability between the Ti—N bonding layer 5 and the electrode layer 6 made of a noble metal is also high. Furthermore, since the bonding layer 5 comprising of a Ti—N nitride is hard to be oxidized compared with metals such as Cr and Ni—Cr, and is thus hard to increase resistance, a high reliability can be obtained. Therefore, a high bondability between the thin film thermistor portion 3, the bonding layer 5, and the electrode layer 6, a high reliability to bending or the like as well as a stable thermistor characteristic even under a high-temperature environment can be obtained as in a conventional Cr bonding layer.

In addition, since the insulation substrate 2 is an insulation film, a thin temperature sensor that is deposited as a film as a whole can be obtained, which is flexible and has a smooth surface. Thus, the installation freedom thereof can be significantly improved. Furthermore, the separation of the thin film thermistor portion 3 is hard to occur when the insulation film is bent, and its placement on a curved surface or the like is also possible.

In addition, in the method for producing the temperature sensor 1, since the deposited bonding layer 5 is etched using Ti etchant having a higher etching speed with respect to Ti—N than Ti—Al—N so as to be patterned into a predetermined shape, only the Ti—N bonding layer 5 can be easily patterned using the difference of etching speed.

In addition, since the thin film thermistor portion 3 consists of a metal nitride represented by the general formula: $Ti_xAl_yN_z$ (where $0.70 \leq y/(x+y) \leq 0.95$, $0.4 \leq z \leq 0.5$, and $x+y+z=1$), wherein the crystal structure thereof is a hexagonal crystal system and a wurtzite-type single phase, a good B constant and a high heat resistance can be obtained without firing.

In addition, since this metal nitride material is a columnar crystal extending in a vertical direction with respect to the surface of the film, the crystallinity of the film is high. Consequently, a high heat resistance can be obtained.

Furthermore, since this metal nitride material is more strongly oriented along the c-axis than the a-axis in a vertical direction with respect to the surface of the film, a high B constant as compared with the case of a strong a-axis orientation can be obtained.

Note that, in the method for producing the thermistor material layer (the thin film thermistor portion 3) of the present embodiment, since film deposition is performed by reactive sputtering in a nitrogen-containing atmosphere using a Ti—Al alloy sputtering target, the metal nitride material consisting of Ti—Al—N can be deposited on a film without firing.

In addition, since the sputtering gas pressure during the reactive sputtering is set to less than 0.67 Pa, a film made of the metal nitride material, which is more strongly oriented along the c-axis than the a-axis in a vertical direction to the surface of the film, can be formed.

Thus, in the temperature sensor 1 of the present embodiment, since the thin film thermistor portion 3 made of the above-described thermistor material layer is formed on the insulation substrate 2, the insulation substrate 2 having a low heat resistance, such as a resin film, can be used because the thin film thermistor portion 3 is formed without firing and has a high B constant and a high heat resistance. Consequently, a thin and flexible thermistor sensor having a good thermistor characteristic can be obtained.

In addition, a substrate material employing a ceramic such as alumina that has often been conventionally used has a problem that if the substrate material is thinned to a thickness of 0.1 mm for example, the substrate material is very fragile and breaks easily. On the other hand, since a film can be used in the present invention, a very thin film type thermistor sensor having a thickness of 0.1 mm can be obtained, for example.

EXAMPLES

Next, the evaluation results of the temperature sensors according to Examples produced based on the above embodiments regarding the temperature sensor and the method for producing the same according to the present invention will be specifically described with reference to FIGS. 5 to 13.

<Heat Resistance Test Evaluation Regarding Electrode Structure>

The temperature sensors according to Examples produced based on the embodiments described above were examined on the change rate of resistance values and the change rate of B constants when a heat resistance test was performed. Specifically, a heat resistance test was performed on the temperature sensors according to Examples produced at a temperature of 125° C. for 1000 hours in air to evaluate the changes of electric properties before and after the heat resistance test (the change rate of resistance values and the change rate of B constants). Temperature sensors employing a Cr bonding layer instead of Ti—N were also produced as Comparative Examples for comparison and similarly evaluated for the above-described properties.

The results of this evaluation showed that the change rate of resistance values in the Comparative Examples was less than 4%, while the change rate of resistance values in the Examples of the present invention was less than 2%. However, the change rates of B constants in both of the Comparative Examples and Examples of the present invention was less than 1%, that is, there was little difference therebetween.

Thus, the change of electric properties in a high-temperature test was small in the Examples of the present invention, showing that the oxidization was suppressed, and therefore a high reliability can be obtained.

<Production of Film Evaluation Element>

Figure 5:
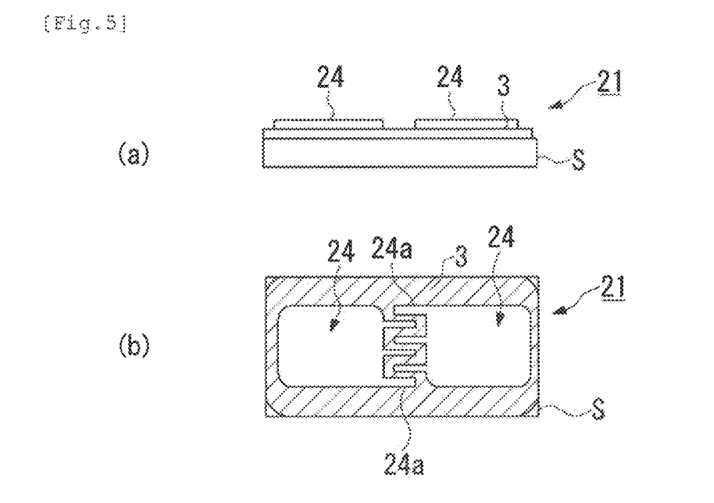
FIG. 5 is a front view and a plan view illustrating a film evaluation element made of a metal nitride material for a thermistor according to an Example of a temperature sensor and a method for producing the same of the present invention.

The film evaluation elements 21 shown in FIG. 5 were produced as Examples and Comparative Examples in order to evaluate the thermistor material layer (the thin film thermistor portion 3) of the present invention.

Firstly, each of the thin film thermistor portions 3 having a thickness of 500 nm, which were made of the metal nitride materials with various composition ratios shown in Table 1, was formed on an Si wafer with a thermal oxidation film as an Si substrate S by using Ti—Al alloy targets with various composition ratios by a reactive sputtering method. The sputtering conditions at this time are as follows: an ultimate vacuum: $5 \times 10^{-6}$ Pa, a sputtering gas pressure: 0.1 to 1 Pa, a target input power (output): 100 to 500 W, and a nitrogen gas partial pressure under a mixed gas (Ar gas+nitrogen gas) atmosphere: 10 to 100%.

Next, a Cr film having a thickness of 20 nm was formed and an Au film having a thickness of 200 nm was further formed on each of the thin film thermistor portions 3 by a sputtering method. Furthermore, a resist solution was coated on the stacked metal films using a spin coater, and then pre-baking was performed for 1.5 minutes at a temperature of 110° C. After being exposed by an exposure device, any unnecessary portion was removed by a developing solution, and then patterning was performed by post-baking for 5 minutes at a temperature of 150° C. Then, any unnecessary electrode portion was subject to wet etching using commercially available Au etchant and Cr etchant, and then the resist was stripped so as to form the pair of pattern electrodes 24, each having the desired comb shaped electrode portion 24a. Then, the resultant elements were diced into chip elements so as to obtain film evaluation elements 21 used for evaluating a B constant and for testing heat resistance.

Note that the film evaluation elements 21 according to Comparative Examples, which have the composition ratios of $Ti_xAl_yN_z$ outside the range of the present invention and have different crystal systems, were similarly produced for comparative evaluation.

<Film Evaluation>

(1) Composition Analysis

Elemental analysis was performed on the thin film thermistor portions 3 obtained by the reactive sputtering method by X-ray photoelectron spectroscopy (XPS). In the XPS, a quantitative analysis was performed on a sputtering surface at a depth of 20 nm from the outermost surface by Ar sputtering. The results are shown in Table 1. In the following tables, the composition ratios are expressed by "at %".

In the X-ray photoelectron spectroscopy (XPS), a quantitative analysis was performed under the conditions of an X-ray source of MgKα (350 W), a path energy of 58.5 eV, a measurement interval of 0.125 eV, a photo-electron take-off angle with respect to a sample surface of 45 degrees, and an analysis area of about 800 μmφ. Note that the quantitative accuracy of N/(Ti+Al+N) and Al/(Ti+Al) was ±2% and ±1%, respectively.

(2) Specific Resistance Measurement

The specific resistance of each of the thin film thermistor portions 3 obtained by the reactive sputtering method was measured by the four-probe method at a temperature of 25° C. The results are shown in Table 1.

(3) Measurement of B Constant

The resistance values for each of the film evaluation elements 21 at temperatures of 25° C. and 50° C. were measured in a constant temperature bath, and a B constant was calculated based on the resistance values at temperatures of 25° C. and 50° C. The results are shown in Table 1.

In the B constant calculating method of the present invention, a B constant is calculated by the following formula using the resistance values at temperatures of 25° C. and 50° C. as described above.

B constant (K)=ln(R25/R50)/(1/T25−1/T50)

R25 (Ω): resistance value at 25° C.

R50 (Ω): resistance value at 50° C.

T25 (K): 298.15 K, which is an absolute temperature of 25° C. expressed in Kelvin T50 (K): 323.15 K, which is an absolute temperature of 50° C. expressed in Kelvin As can be seen from these results, a thermistor characteristic of a resistivity of 100 Ωcm or higher and a B constant of 1500 K or higher is achieved in all of the Examples in which the composition ratios of $Ti_xAl_yN_z$ fall within the region enclosed by the points A, B, C, and D in the ternary phase diagram shown in FIG. 3, i.e., the region where "0.70≤y/(x+y)≤0.95, 0.4≤z≤0.5, and x+y+z=1".

Figure 6:
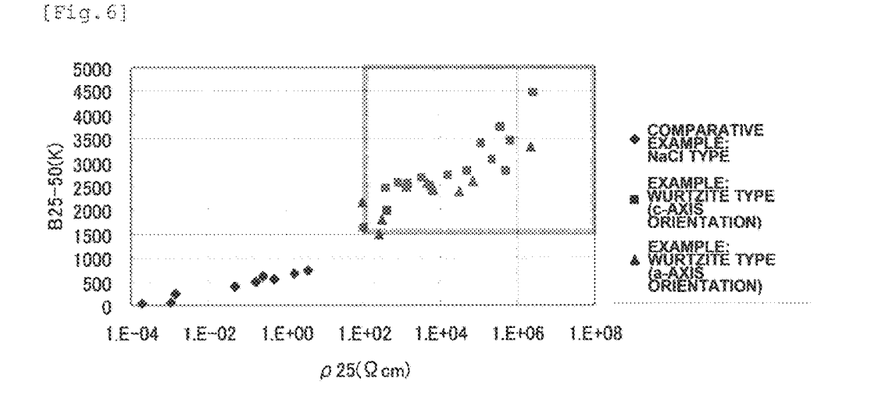
FIG. 6 is a graph illustrating the relationship between a resistivity at 25° C. and a B constant for the materials according to Examples and Comparative Examples of the present invention.
Figure 7:
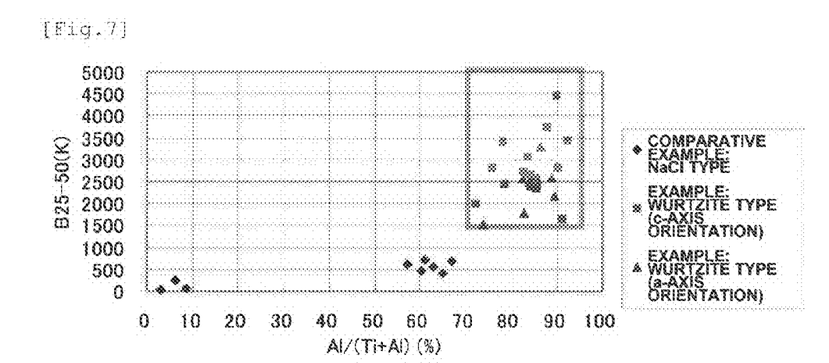
FIG. 7 is a graph illustrating the relationship between an Al/(Ti+Al) ratio and a B constant for the materials according to Examples and Comparative Examples of the present invention.

A graph illustrating the relationship between a resistivity at 25° C. and a B constant obtained from the above results is shown in FIG. 6. In addition, a graph illustrating the relationship between an Al/(Ti+Al) ratio and a B constant is shown in FIG. 7. These graphs shows that the materials of the film evaluation elements 21, the composition ratios of which fall within the region where Al/(Ti+Al) is from 0.7 to 0.95 and N/(Ti+Al+N) is from 0.4 to 0.5 and each crystal system of which is a hexagonal wurtzite-type single phase, have a specific resistance value at a temperature of 25° C. of 100 Ωcm or higher and a B constant of 1500 K or higher, which are the regions realizing a high resistance and a high B constant. Note that, in data shown in FIG. 7, the reason why the B constant varies with respect to nearly the same Al/(Ti+Al) ratio is because the materials of the film evaluation elements 21 have different amounts of nitrogen in their crystals.

In the materials according to Comparative Examples 3 to 12 shown in Table 1, the composition ratios fall within the region where Ai/(Ti+Al)<0.7, and each crystal system thereof is a cubic NaCl-type phase. In addition, in the material according to Comparative Example 12 (Al/(Ti+Al)= 0.67), a NaCl-type phase and a wurtzite-type phase coexist. Thus, a material with the composition ratio that falls within the region where Al/(Ti+Al)<0.7 has a specific resistance value at a temperature of 25° C. of less than 100 Ωcm and a B constant of less than 1500 K, which are the regions of low resistance and low B constant.

In the materials according to Comparative Examples 1 and 2 shown in Table 1, the composition ratios fall within the region where N/(Al+Ti+N) is less than 40%, that is, the materials are in a crystal state where nitridation of metals contained therein is insufficient. The materials according to Comparative Example 1 and 2 were neither a NaCl-type nor wurtzite-type phase and had very poor crystallinity. In addition, it was found that the materials according to these Comparative Examples exhibited near-metallic behavior because both of the B constant and the resistance value were very small.

(4) Thin Film X-Ray Diffraction (Identification of Crystal Phase)

The crystal phases of the thin film thermistor portions 3 obtained by the reactive sputtering method were identified by Grazing Incidence X-ray Diffraction. The thin film X-ray diffraction is a small angle X-ray diffraction experiment. The measurement was performed under the conditions of a vessel of Cu, an incidence angle of 1 degree, and 2θ of from 20 to 130 degrees. Some of the samples were measured under the conditions of an incidence angle of 0 degree and 2θ of from 20 to 100 degrees.

As a result of the measurement, a wurtzite-type phase (hexagonal, the same phase as that of Al—N) was obtained in the region where Al/(Ti+Al)≥0.7, whereas a NaCl-type phase (cubic, the same phase as that of Ti—N) was obtained in the region where Al/(Ti+Al)<0.65. In addition, two coexisting phases of a wurtzite-type phase and a NaCl-type phase were obtained in the region where 0.65<Al/(Ti+Al)<0.7.

Thus, in the Ti—Al—N-based material, the regions of high resistance and high B constant can be realized by the wurtzite-type phase having a composition ratio of Al/(Ti+Al)≥0.7. In the Examples of the present invention, no impurity phase was confirmed and each crystal structure thereof was a wurtzite-type single phase.

In Comparative Examples 1 and 2 shown in Table 1, each crystal phase thereof was neither a wurtzite-type nor NaCl-type phase as described above, and thus, could not be identified in the testing. In these Comparative Examples, the peak width of XRD was very large, showing that the materials had very poor crystallinity. It is contemplated that the crystal phases thereof were metal phases with insufficient nitridation because they exhibited near-metallic behavior from the viewpoint of electric properties.

TABLE 1

| | CRYSTAL SYSTEM | XRD PEAK INTENSITY RATIO OF (100)/(002) WHEN CRYSTAL PHASE IS WURTZITE TYPE | CRYSTAL AXIS EXHIBITING STRONG DEGREE OF ORIENTATION IN VERTICAL DIRECTION WITH RESPECT TO SUBSTRATE SURFACE WHEN CRYSTAL PHASE IS WURTZITE TYPE PHASE (a-AXIS OR c-AXIS) | SPUTTERING GAS PRESSURE (Pa) |
|---|---|---|---|---|
| COMPARATIVE EXAMPLE 1 | UNKNOWN (INSUFFICIENT NITRIDATION) | — | | — |
| COMPARATIVE EXAMPLE 2 | UNKNOWN (INSUFFICIENT NITRIDATION) | — | | — |
| COMPARATIVE EXAMPLE 3 | NaCl TYPE | — | | — |

TABLE 1-continued

| | | | | |
|---|---|---|---|---|
| COMPARATIVE EXAMPLE 4 | NaCl TYPE | — | | — |
| COMPARATIVE EXAMPLE 5 | NaCl TYPE | — | | — |
| COMPARATIVE EXAMPLE 6 | NaCl TYPE | — | | — |
| COMPARATIVE EXAMPLE 7 | NaCl TYPE | — | | — |
| COMPARATIVE EXAMPLE 8 | NaCl TYPE | — | | — |
| COMPARATIVE EXAMPLE 9 | NaCl TYPE | — | | — |
| COMPARATIVE EXAMPLE 10 | NaCl TYPE | — | | — |
| COMPARATIVE EXAMPLE 11 | NaCl TYPE | — | | — |
| COMPARATIVE EXAMPLE 12 | NaCl TYPE + WURTZRITE TYPE | — | | — |
| EXAMPLE 1 | WURTZRITE TYPE | 0.05 | c-AXIS | <0.67 |
| EXAMPLE 2 | WURTZRITE TYPE | 0.07 | c-AXIS | <0.67 |
| EXAMPLE 3 | WURTZRITE TYPE | 0.45 | c-AXIS | <0.67 |
| EXAMPLE 4 | WURTZRITE TYPE | <0.01 | c-AXIS | <0.67 |
| EXAMPLE 5 | WURTZRITE TYPE | 0.34 | c-AXIS | <0.37 |
| EXAMPLE 6 | WURTZRITE TYPE | <0.01 | c-AXIS | <0.67 |
| EXAMPLE 7 | WURTZRITE TYPE | 0.09 | c-AXIS | <0.67 |
| EXAMPLE 8 | WURTZRITE TYPE | 0.05 | c-AXIS | <0.67 |
| EXAMPLE 9 | WURTZRITE TYPE | <0.01 | c-AXIS | <0.67 |
| EXAMPLE 10 | WURTZRITE TYPE | 0.04 | c-AXIS | <0.67 |
| EXAMPLE 11 | WURTZRITE TYPE | 0.24 | c-AXIS | <0.67 |
| EXAMPLE 12 | WURTZRITE TYPE | 0.73 | c-AXiS | <0.67 |
| EXAMPLE 13 | WURTZRITE TYPE | <0.01 | c-AXIS | <0.67 |
| EXAMPLE 14 | WURTZRITE TYPE | 0.38 | c-AXIS | <0.67 |
| EXAMPLE 15 | WURTZRITE TYPE | 0.13 | c-AXIS | <0.67 |
| EXAMPLE 16 | WURTZRITE TYPE | 3.54 | a-AXIS | ≥0.67 |
| EXAMPLE 17 | WURTZRITE TYPE | 2.94 | a-AXIS | ≥0.67 |
| EXAMPLE 18 | WURTZRITE TYPE | 1.05 | a-AXIS | ≥0.67 |
| EXAMPLE 19 | WURTZRITE TYPE | 2.50 | a-AXIS | ≥0.67 |
| EXAMPLE 20 | WURTZRITE TYPE | 9.09 | a-AXIS | ≥0.67 |
| EXAMPLE 21 | WURTZRITE TYPE | 6.67 | a-AXIS | ≥0.67 |
| EXAMPLE 22 | WURTZRITE TYPE | 2.22 | a-AXIS | ≥0.67 |
| EXAMPLE 23 | WURTZRITE TYPE | 1.21 | a-AXIS | ≥0.67 |
| EXAMPLE 24 | WURTZRITE TYPE | 3.33 | a-AXIS | ≥0.67 |

| | COMPOSITION RATIO | | | | RESULT OF ELECTRIC PROPERTIES | |
|---|---|---|---|---|---|---|
| | Ti(%) | Al(%) | N(%) | Al/(Ti + Al) (%) | B CONSTANT (K) | SPECIFIC RESISTANCE VALUE AT 25° C. (Ω cm) |
| COMPARATIVE EXAMPLE 1 | 29 | 43 | 28 | 60 | <0 | 2.E−04 |
| COMPARATIVE EXAMPLE 2 | 16 | 54 | 30 | 77 | 25 | 4.E−04 |
| COMPARATIVE EXAMPLE 3 | 50 | 0 | 50 | 0 | <0 | 2.E−05 |
| COMPARATIVE EXAMPLE 4 | 47 | 1 | 52 | 3 | 30 | 2.E−04 |
| COMPARATIVE EXAMPLE 5 | 51 | 3 | 46 | 6 | 248 | 1.E−03 |
| COMPARATIVE EXAMPLE 6 | 50 | 5 | 45 | 9 | 69 | 1.E−03 |
| COMPARATIVE EXAMPLE 7 | 23 | 30 | 47 | 57 | 622 | 3.E−01 |
| COMPARATIVE EXAMPLE 8 | 22 | 33 | 45 | 60 | 477 | 2.E−01 |
| COMPARATIVE EXAMPLE 9 | 21 | 32 | 47 | 61 | 724 | 4.E+00 |
| COMPARATIVE EXAMPLE 10 | 20 | 34 | 46 | 63 | 564 | 5.E−01 |
| COMPARATIVE EXAMPLE 11 | 19 | 35 | 46 | 65 | 402 | 5.E−02 |
| COMPARATIVE EXAMPLE 12 | 18 | 37 | 45 | 67 | 665 | 2.E+00 |
| EXAMPLE 1 | 15 | 38 | 47 | 72 | 1980 | 4.E+02 |
| EXAMPLE 2 | 12 | 38 | 50 | 76 | 2798 | 5.E+04 |
| EXAMPLE 3 | 11 | 42 | 47 | 79 | 3385 | 1.E+05 |
| EXAMPLE 4 | 11 | 41 | 46 | 79 | 2437 | 4.E+02 |

TABLE 1-continued

| | | | | | | |
|---|---|---|---|---|---|---|
| EXAMPLE 5 | 9 | 43 | 48 | 83 | 2727 | 2.E+04 |
| EXAMPLE 6 | 8 | 42 | 50 | 84 | 3057 | 2.E+05 |
| EXAMPLE 7 | 8 | 44 | 48 | 84 | 2665 | 3.E+03 |
| EXAMPLE 8 | 8 | 44 | 48 | 85 | 2527 | 1.E+03 |
| EXAMPLE 9 | 8 | 45 | 47 | 86 | 2557 | 8.E+02 |
| EXAMPLE 10 | 7 | 46 | 46 | 86 | 2449 | 1.E+03 |
| EXAMPLE 11 | 7 | 48 | 45 | 88 | 3729 | 4.E+05 |
| EXAMPLE 12 | 5 | 49 | 46 | 90 | 2798 | 5.E+05 |
| EXAMPLE 13 | 5 | 45 | 50 | 90 | 4449 | 3.E+06 |
| EXAMPLE 14 | 5 | 50 | 45 | 91 | 1621 | 1.E+02 |
| EXAMPLE 15 | 4 | 50 | 46 | 93 | 3439 | 6.E+05 |
| EXAMPLE 16 | 15 | 43 | 42 | 74 | 1507 | 3.E+02 |
| EXAMPLE 17 | 10 | 49 | 41 | 83 | 1794 | 3.E+02 |
| EXAMPLE 18 | 6 | 52 | 42 | 90 | 2164 | 1.E+02 |
| EXAMPLE 19 | 9 | 44 | 47 | 83 | 2571 | 5.E+03 |
| EXAMPLE 20 | 8 | 46 | 46 | 84 | 2501 | 6.E+03 |
| EXAMPLE 21 | 8 | 45 | 47 | 84 | 2408 | 7.E+03 |
| EXAMPLE 22 | 8 | 46 | 46 | 86 | 2364 | 3.E+04 |
| EXAMPLE 23 | 7 | 46 | 47 | 87 | 3317 | 2.E+06 |
| EXAMPLE 24 | 6 | 51 | 43 | 89 | 2599 | 7.E+04 |

Next, since all the materials according to the Examples of the present invention were wurtzite-type phase films having strong orientation, whether the films have a strong a-axis orientation or c-axis orientation of the crystal axis in a vertical direction (film thickness direction) with respect to the Si substrate S was examined by XRD. At this time, in order to examine the orientation of the crystal axis, the peak intensity ratio of (100)/(002) was measured, where (100) is the Miller index indicating a-axis orientation and (002) is the Miller index indicating c-axis orientation.

Consequently, in the Examples in which film deposition was performed at a sputtering gas pressure of less than 0.67 Pa, the intensity of (002) was much stronger than that of (100), that is, the films exhibited stronger c-axis orientation than a-axis orientation. On the other hand, in the Examples in which film deposition was performed at a sputtering gas pressure of 0.67 Pa or higher, the intensity of (100) was much stronger than that of (002), that is, the films exhibited stronger a-axis orientation than c-axis orientation.

Note that it was confirmed that a wurtzite-type single phase was formed in the same manner even when the thin film thermistor portion 3 was deposited on a polyimide film under the same deposition condition. It was also confirmed that the crystal orientation did not change even when the thin film thermistor portion 3 was deposited on a polyimide film under the same deposition condition.

Figure 8:
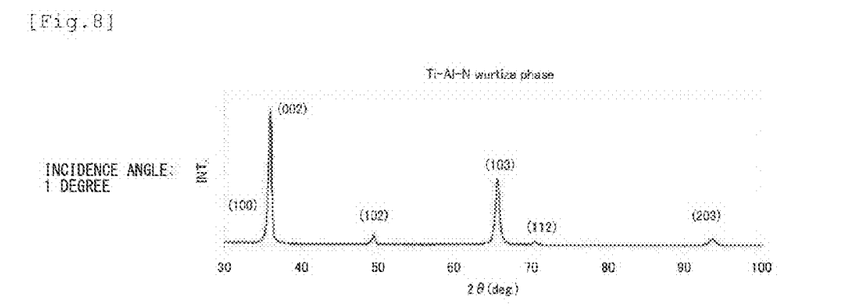
FIG. 8 is a graph illustrating the result of X-ray diffraction (XRD) performed on a material according to the Example of the present invention having a strong c-axis orientation and an Al/(Ti+Al) ratio of 0.84.

An exemplary XRD profile of the material according to the Example exhibiting strong c-axis orientation is shown in FIG. 8. In this Example, Al/(Ti+Al) was equal to 0.84 (wurtzite-type, hexagonal), and the measurement was performed at an incidence angle of 1 degree. As can be seen from the result, the intensity (100) was much stronger than that of (002) in this Example.

Figure 9:
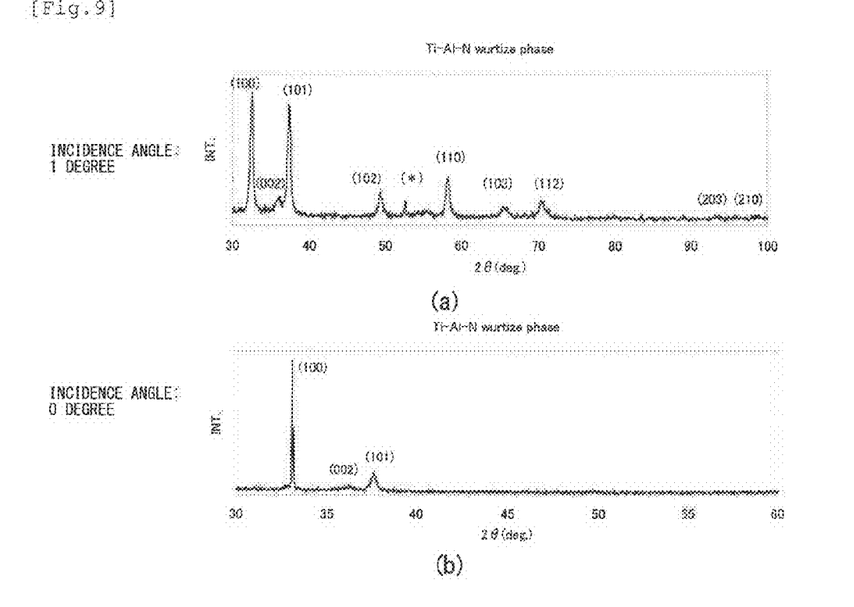
FIG. 9 is a graph illustrating the result of X-ray diffraction (XRD) performed on a material according to the Example of the present invention having a strong a-axis orientation and an Al/(Ti+Al) ratio of 0.83.

In addition, an exemplary XRD profile of the material according to the Example exhibiting strong a-axis orientation is shown in FIG. 9. In this Example, Al/(Ti+Al) was equal to 0.83 (wurtzite-type, hexagonal), and the measurement was performed at an incidence angle of 1 degree. As can be seen from the result, the intensity of (100) was much stronger than that of (002) in this Example.

Furthermore, the symmetrical measurement was performed on the material according to this Example at an incidence angle of 0 degree. It was confirmed that the peak with the asterisk (*) in the graph was a peak originating from the device, and thus, the peak with the asterisk (*) in the graph was neither a peak originating from a sample itself nor a peak originating from an impurity phase (which could also be confirmed from the fact that the peak with (*) was lost in the symmetrical measurement).

Figure 10:
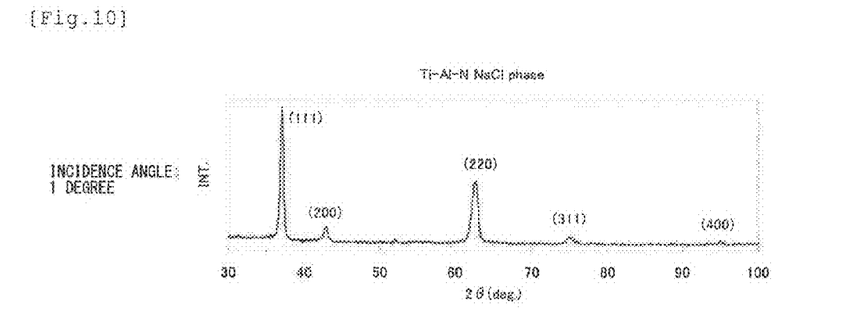
FIG. 10 is a graph illustrating the result of X-ray diffraction (XRD) performed on a material according to the Comparative Example of the present invention having an Al/(Ti+Al) ration of 0.60.

An exemplary XRD profile of the material according to a Comparative Example is shown in FIG. 10. In this Comparative Example, Al/(Ti+Al) was equal to 0.6 (NaCl type, cubic), and the measurement was performed at an incidence angle of 1 degree. No peak which could be indexed as a wurtzite-type (space group: P6$_3$mc (No. 186)) was detected, and thus, the material according to this Comparative Example was confirmed as a NaCl-type single phase.

Next, the correlations between a crystal structure and its electric properties were further compared with each other in detail regarding the Examples of the present invention in which the wurtzite-type materials were employed.

Figure 11:
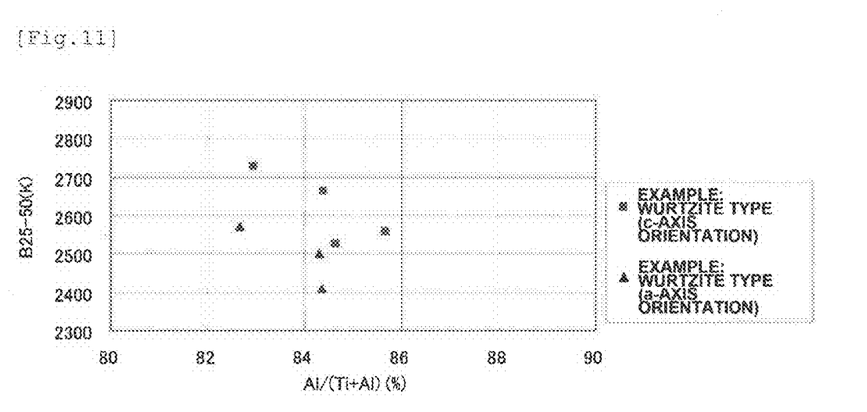
FIG. 11 is a graph illustrating the relationship between an Al/(Ti+Al) ratio and a B constant for the comparison of a material exhibiting a strong a-axis orientation and a material exhibiting a strong c-axis orientation according to Examples of the present invention.

As shown in Table 2 and FIG. 11, the crystal axis of some materials (Examples 5, 7, 8, and 9) is strongly oriented along a c-axis in a vertical direction with respect to the surface of the substrate and that of other materials (Examples 19, 20, and 21) is strongly oriented along an a-axis in a vertical direction with respect to the surface of the substrate among the materials having nearly the same Al/(Ti+Al) ratio.

When both groups were compared to each other, it was found that the materials having a strong c-axis orientation had a higher B constant by about 100 K than that of the materials having a strong a-axis orientation provided that they have nearly the same Al/(Ti+Al) ratio. When focus was placed on the amount of N (N/(Ti+Al+N)), it was found that the materials having a strong c-axis orientation had a slightly larger amount of nitrogen than that of the materials having a strong a-axis orientation. Since the ideal stoichiometric ratio of N/(Ti+Al+N) is 0.5, it was found that the materials having a c-axis orientation were ideal materials due to a small amount of nitrogen defects.

TABLE 2

| | CRYSTAL SYSTEM | XRD PEAK INTENSITY RATIO OF (100)/(002) WHEN CRYSTAL PHASE IS WURTZRITE TYPE | CRYSTAL AXIS EXHIBITING STRONG DEGREE OF ORIENTATION IN VERTICAL DIRECTION WITH RESPECT TO SUBSTRATE SURFACE WHEN CRYSTAL PHASE IS WURTZRITE TYPE PHASE (a-AXIS OR c-AXIS) | SPUTTERING GAS PRESSURE (Pa) | COMPOSITION RATIO | | | | B CONSTANT (K) | RESULT OF ELECTRIC PROPERTIES SPECIFIC RESISTANCE VALUE AT 25° C. ($\Omega$ cm) |
|---|---|---|---|---|---|---|---|---|---|---|
| | | | | | Ti(%) | Al(%) | N(%) | Al/(Ti + Al) (%) | | |
| EXAMPLE 5 | WURTZRITE TYPE | 0.34 | c-AXIS | <0.67 | 9 | 43 | 48 | 83 | 2727 | 2.E+04 |
| EXAMPLE 7 | WURTZRITE TYPE | 0.09 | c-AXIS | <0.67 | 8 | 44 | 48 | 84 | 2665 | 3.E+03 |
| EXAMPLE 8 | WURTZRITE TYPE | 0.05 | c-AXIS | <0.67 | 8 | 44 | 48 | 85 | 2527 | 1.E+03 |
| EXAMPLE 9 | WURTZRITE TYPE | <0.01 | c-AXIS | <0.67 | 8 | 45 | 47 | 86 | 2557 | 8.E+02 |
| EXAMPLE 19 | WURTZRITE TYPE | 2.50 | a-AXIS | ≥0.67 | 9 | 44 | 47 | 83 | 2571 | 5.E+03 |
| EXAMPLE 20 | WURTZRITE TYPE | 9.09 | a-AXIS | ≥0.67 | 8 | 46 | 46 | 84 | 2501 | 6.E+03 |
| EXAMPLE 21 | WURTZRITE TYPE | 6.67 | a-AXIS | ≥0.67 | 8 | 45 | 47 | 84 | 2408 | 7.E+03 |

<Crystal Form Evaluation>

Figure 12:
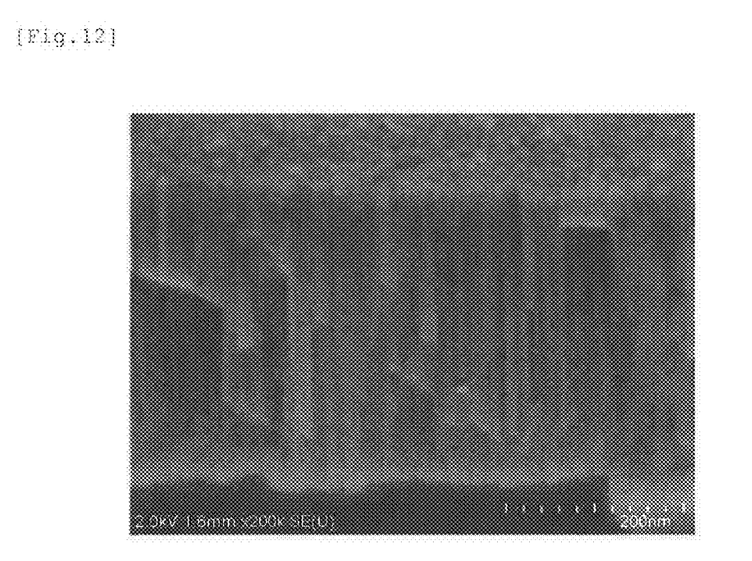
FIG. 12 is a cross-sectional SEM photograph illustrating a material exhibiting a strong c-axis orientation according to an Example of the present invention.
Figure 13:
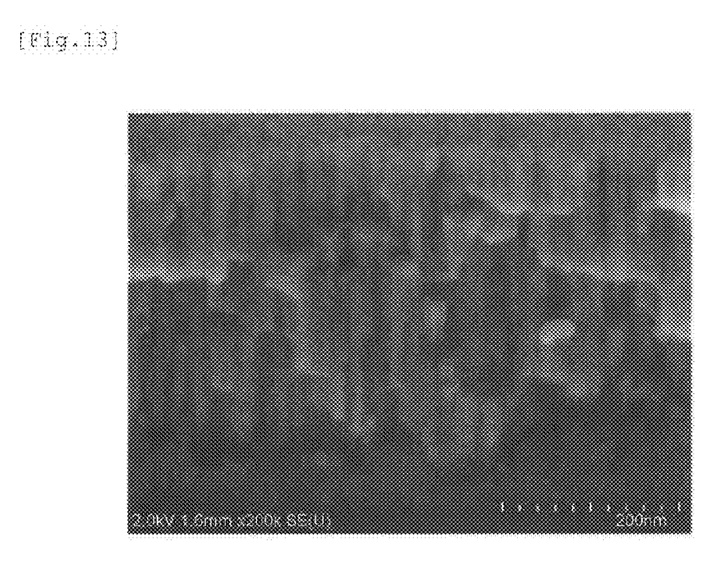
FIG. 13 is a cross-sectional SEM photograph illustrating a material exhibiting a strong a-axis orientation according to an Example of the present invention.

Next, as an exemplary crystal form in the cross-section of the thin film thermistor portion 3, a cross-sectional SEM photograph of the thin film thermistor portion 3 according to one Example (where Al/(Ti+Al)=0.84, wurtzite-type hexagonal, and strong c-axis orientation), which is deposited on the Si substrate S with a thermal oxidation film, is shown in FIG. 12. In addition, a cross-sectional SEM photograph of the thin film thermistor portion 3 according to another Example (where Al/(Ti+Al)=0.83, wurtzite-type hexagonal, and strong a-axis orientation) is shown in FIG. 13.

The samples of these Examples were obtained by breaking the Si substrates S by cleavage. The photographs were taken by tilt observation at an angle of 45 degrees.

As can be seen from these photographs, the samples were formed of high-density columnar crystals in all Examples. Specifically, the growth of columnar crystals in a vertical, direction with respect to the surface of the substrate was observed both in the materials according to Examples exhibiting a strong c-axis orientation and in the materials according to the Examples exhibiting a strong a-axis orientation. Note that the break of the columnar crystals was generated upon breaking the Si substrate S by cleavage.

<Heat Resistance Test Evaluation>

In the Examples and Comparative Example shown in Table 3, a resistance value and a B constant before and after the heat resistance test at a temperature of 125° C. for 1000 hours in air were evaluated. The results are shown in Table 3. A conventional Ta—Al—N-based material according to a Comparative Example was also evaluated in the same manner for comparison.

As can be seen from these results, although the Al concentration and the nitrogen concentration vary, the heat resistance of the Ti—Al—N-based material based on the change of electric properties before and after the heat resistance test is more excellent than that of the Ta—Al—N-based material according to the Comparative Example when comparison is made by using the materials according to the Examples having the same B constant as that of the Ta—Al—N-based material according to the Comparative Example. Note that the materials according to Examples 5 and 8 have a strong c-axis orientation, and the materials according to Examples 21 and 24 have a strong a-axis orientation. When both groups were compared to each other, the heat resistance of the materials according to the Examples exhibiting a strong c-axis orientation is slightly improved as compared with that of the materials according to the Examples exhibiting a strong a-axis orientation.

Note that, in the Ta—Al—N-based material, the ionic radius of Ta is much larger than that of Ti and Al, and thus, a wurtzite-type phase cannot be produced in the high-concentration Al region. It is contemplated that the Ti—Al—N-based material having a wurtzite-type phase has better heat resistance than the Ta—Al—N-based material because the Ta—Al—N-based material is not a wurtzite-type phase.

TABLE 3

| | M ELEMENT | M(%) | Al(%) | N(%) | Al/(M + Al) (%) | B25-50 (K) | SPECIFIC RESISTANCE VALUE AT 25° C. ($\Omega$ cm) | RISING RATE OF SPECIFIC RESISTANCE AT 25° C. AFTER HEAT RESISTANCE TEST AT 125° C. FOR 1000 HOURS (%) | RISING RATE OF B CONSTANT AFTER HEAT RESISTANCE TEST AT 125° C. FOR 1,000 HOURS (%) |
|---|---|---|---|---|---|---|---|---|---|
| COMPARATIVE EXAMPLE | Ta | 60 | 1 | 39 | 2 | 2671 | 5.E+02 | 25 | 16 |
| EXAMPLE 5 | Ti | 9 | 43 | 48 | 83 | 2727 | 2.E+04 | <4 | <1 |

TABLE 3-continued

|  | M ELEMENT | M(%) | Al(%) | N(%) | Al/(M + Al) (%) | B25-50 (K) | SPECIFIC RESISTANCE VALUE AT 25° C. (Ω cm) | RISING RATE OF SPECIFIC RESISTANCE AT 25° C. AFTER HEAT RESISTANCE TEST AT 125° C. FOR 1000 HOURS (%) | RISING RATE OF B CONSTANT AFTER HEAT RESISTANCE TEST AT 125° C. FOR 1,000 HOURS (%) |
|---|---|---|---|---|---|---|---|---|---|
| EXAMPLE 8 | Ti | 8 | 44 | 48 | 85 | 2527 | 1.E+03 | <4 | <1 |
| EXAMPLE 21 | Ti | 8 | 45 | 47 | 84 | 2408 | 7.E+03 | <5 | <1 |
| EXAMPLE 24 | Ti | 6 | 51 | 43 | 89 | 2599 | 7.E+04 | <5 | <1 |

The technical scope of the present invention is not limited to the aforementioned embodiments and Examples, but the present invention may be modified in various ways without departing from the scope or teaching of the present invention.

REFERENCE NUMERALS

1: temperature sensor, 2: insulation substrate, 3: thin film thermistor portion, 4: pattern electrode, 5: bonding layer, 4a: opposed electrode portion, 6: electrode layer

What is claimed is:

1. A temperature sensor comprising:
an insulation substrate;
a thin film thermistor portion formed on the insulation substrate; and
a pair of pattern electrodes formed on the insulation substrate with a pair of opposed electrode portions being arranged so as to be opposed to each other on the thin film thermistor portion,
wherein the thin film thermistor portion is made of a Ti—Al—N thermistor material,
the pair of pattern electrodes has a Ti—N bonding layer formed directly on the thin film thermistor portion and an electrode layer made of a noble metal formed on the bonding layer, and
the Ti—N bonding layer has a bondability to the thin film thermistor portion and the electrode layer, respectively.

2. The temperature sensor according to claim 1, wherein the insulation substrate is an insulation film.

3. The temperature sensor according to claim 1, wherein the thin film thermistor portion consists of a metal nitride represented by the general formula: $Ti_xAl_yN_z$ (where $0.70 \leq y/(x+y) \leq 0.95$, $0.4 \leq z \leq 0.5$, and $x+y+z=1$), wherein the crystal structure thereof is a hexagonal wurtzite-type single phase.

4. A method for producing the temperature sensor according to claim 1, the method comprising the steps of:
forming a film thermistor portion for patterning the thin film thermistor portion on the insulation substrate;
forming an electrode for patterning the pair of pattern electrodes on the insulation substrate with the pair of opposed electrode portions being arranged so as to be opposed to each other on the thin film thermistor portion,
wherein the step of forming a film thermistor portion includes a step of patterning the Ti—Al—N thin film thermistor portion on the insulation substrate,
the step of forming an electrode includes the steps of:
depositing the bonding layer on the thin film thermistor portion and the insulation substrate;
depositing the electrode layer on the bonding layer;
etching the deposited electrode layer so as to be patterned into a predetermined shape; and
etching the deposited bonding layer using Ti etchant, the Ti etchant selectively etches the Ti—N bonding layer among the Ti—Al—N thin film thermistor portion and the Ti—N bonding layer, so as to be patterned into a predetermined shape.

* * * * *